US009740641B2

(12) United States Patent
Hayashi et al.

(10) Patent No.: US 9,740,641 B2
(45) Date of Patent: Aug. 22, 2017

(54) INFORMATION PROCESSING DEVICE, I/O SYSTEM, AND I/O CONTROL METHOD

(71) Applicant: NEC CORPORATION, Tokyo (JP)

(72) Inventors: Yuki Hayashi, Tokyo (JP); Junichi Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 14/904,133

(22) PCT Filed: Jul. 15, 2014

(86) PCT No.: PCT/JP2014/003735
§ 371 (c)(1),
(2) Date: Jan. 11, 2016

(87) PCT Pub. No.: WO2015/011895
PCT Pub. Date: Jan. 29, 2015

(65) Prior Publication Data
US 2016/0147677 A1 May 26, 2016

(30) Foreign Application Priority Data

Jul. 23, 2013 (JP) ................................. 2013-152704

(51) Int. Cl.
*G06F 3/06* (2006.01)
*G06F 13/16* (2006.01)
(Continued)

(52) U.S. Cl.
CPC .......... *G06F 13/1668* (2013.01); *G06F 3/061* (2013.01); *G06F 3/0604* (2013.01);
(Continued)

(58) Field of Classification Search
None
See application file for complete search history.

(56) References Cited

U.S. PATENT DOCUMENTS 9,317,317 B2 * 4/2016 Graham .............. G06F 9/45558
2012/0159245 A1 * 6/2012 Brownlow .......... G06F 11/0712
714/23
(Continued)

FOREIGN PATENT DOCUMENTS

JP 2008-310489 A 12/2008
JP 2011-081462 A 4/2011
(Continued)

OTHER PUBLICATIONS

International Search Report for PCT/JP2014/003735 dated Sep. 30, 2014.

*Primary Examiner* — Kevin Verbrugge
(74) *Attorney, Agent, or Firm* — Sughrue Mion, PLLC

(57) ABSTRACT

An information processing device that are capable of continuing access to an I/O device by operational computers even when a failure has occurred in a management computer is provided.
A virtualization bridge (300) includes a monitoring unit (307) and a backup control unit (308). The virtualization bridge (300) provides operational computers (200) with virtual functions of an I/O device (400). The monitoring unit (307) detects failures in a management computer (100). The backup control unit (308) generates backup management information (341) on the basis of packets transmitted and received between the management computer (100) and the I/O device (400), and, when a failure in the management computer (100) is detected by the monitoring unit (307), controls the I/O device 400 on the basis of the backup management information (341) in place of the management computer (100).

12 Claims, 14 Drawing Sheets

(51) Int. Cl.
*G06F 11/20* (2006.01)
*G06F 9/455* (2006.01)
*G06F 13/40* (2006.01)

(52) U.S. Cl.
CPC .......... *G06F 3/0619* (2013.01); *G06F 3/0631* (2013.01); *G06F 3/0638* (2013.01); *G06F 3/0653* (2013.01); *G06F 3/0673* (2013.01); *G06F 9/45558* (2013.01); *G06F 11/2033* (2013.01); *G06F 13/4068* (2013.01); *G06F 11/2038* (2013.01); *G06F 2009/45579* (2013.01)

(56) References Cited

U.S. PATENT DOCUMENTS

| | | | | |
|---|---|---|---|---|
| 2012/0179932 | A1* | 7/2012 | Armstrong | G06F 11/20 714/4.11 |
| 2014/0372794 | A1* | 12/2014 | Graham | G06F 9/5077 714/15 |
| 2016/0077847 | A1* | 3/2016 | Hunter | G06F 13/20 718/1 |
| 2016/0077884 | A1* | 3/2016 | Hunter | G06F 9/5077 718/104 |

FOREIGN PATENT DOCUMENTS

| | | |
|---|---|---|
| JP | 2012-198651 A | 10/2012 |
| WO | 2009/025381 A1 | 2/2009 |

\* cited by examiner

Fig. 4

411 PF CFG REG

| VF ENABLE FLAG | | Enable |
|---|---|---|
| MAXIMUM NUMBER OF VFs | | N |
| NUMBER OF VFs | | N |
| VF RESET FLAG | VF420-1 | Reset |
| | VF420-2 | --- |
| | ⋮ | ⋮ |
| | VF420-N | --- |
| PF AREA SIZE | | Spf |
| PF MAP AREA INFORMATION | | A00 |

Fig. 5

421-1 VF CFG REG

| VF AREA SIZE | Svf1 |
|---|---|
| VF MAP AREA INFORMATION | A01 |

⋮

421-N VF CFG REG

| VF AREA SIZE | SvfN |
|---|---|
| VF MAP AREA INFORMATION | A0n |

Fig. 6

111 MANAGEMENT INFORMATION

| | | |
|---|---|---|
| VF ENABLE FLAG | | Enable |
| NUMBER OF VFs | | N |
| VF STATE | VF420-1 | ABNORMAL |
| | VF420-2 | NORMAL |
| | ⋮ | ⋮ |
| | VF420-N | NORMAL |
| ⋮ | | ⋮ |

Fig. 7

311 VIRTUAL PF CFG REG

| | | |
|---|---|---|
| VF ENABLE FLAG | | Enable |
| MAXIMUM NUMBER OF VFs | | N |
| NUMBER OF VFs | | N |
| VF RESET FLAG | VF420-1 | Reset |
| | VF420-2 | — |
| | ⋮ | ⋮ |
| | VF420-N | — |
| PF AREA SIZE | | Spf |
| PF MAP AREA INFORMATION | | A00 |
| VIRTUAL PF MAP AREA INFORMATION | | VA00 |

Fig. 8

321-1 VIRTUAL VF CFG REG

| VF AREA SIZE | Svf1 |
|---|---|
| VF MAP AREA INFORMATION | A01 |
| VIRTUAL VF MAP AREA INFORMATION | VA01 |

⋮

321-N VIRTUAL VF CFG REG

| VF AREA SIZE | SvfN |
|---|---|
| VF MAP AREA INFORMATION | A0n |
| VIRTUAL VF MAP AREA INFORMATION | VA0n |

Fig. 9

331 DUPLICATION TARGET INFORMATION

| DUPLICATION CONDITION | CONFIGURATION WRITE REQUEST (VF ENABLE FLAG, NUMBER OF VFs) |
|---|---|
| | MEMORY READ RESPONSE (VF STATE) |
| | ⋮ |

Fig. 10

341 BACKUP MANAGEMENT INFORMATION

| VF ENABLE FLAG | | Enable |
|---|---|---|
| NUMBER OF VFs | | N |
| VF STATE | VF420-1 | ABNORMAL |
| | VF420-2 | NORMAL |
| | ⋮ | ⋮ |
| | VF420-N | NORMAL |
| ⋮ | | ⋮ |

INFORMATION PROCESSING DEVICE, I/O SYSTEM, AND I/O CONTROL METHOD

CROSS REFERENCE TO RELATED APPLICATIONS

This application is a National Stage of International Application No. PCT/JP2014/003735 filed Jul. 15, 2014, claiming priority based on Japanese Patent Application No. 2013-152704 filed Jul. 23, 2013, the contents of all of which are incorporated herein by reference in their entirety.

TECHNICAL FIELD

The present invention relates to an information processing device, an I/O system, and an I/O control method.

BACKGROUND ART

An example of an I/O system in which an I/O (Input/Output) device is shared by a plurality of computers is disclosed in PTL1.

FIG. 17 is a block diagram illustrating a configuration of the I/O system in PTL1.

With reference to FIG. 17, the I/O system in PTL1 includes a plurality of operational computers 700 (700-1, 700-2, ..., 700-N), an I/O device 900 shared by the plurality of operational computers 700, and a virtualization bridge 800. The I/O device 900 conforms to the SR-IOV (Single Root I/O Virtualization) standard. The respective operational computers 700 are connected to the virtualization bridge 800 via a network.

The I/O device 900 includes a PF (Physical Function) 910 and a plurality of VFs (Virtual Function) 920 (920-1, 920-2, ..., 920-N). The PF 910 is an interface for controlling the I/O device 900. The VFs 920 (920-1, 920-2, ..., 920-N) are interfaces for providing functions of the I/O device 900 through virtualization. The VFs 920-1, 920-2, ..., 920-N are associated with the operational computers 700-1, 700-2, ..., 700-N, respectively.

The PF 910 includes a PF configuration register (PF CFG REG) 911 for configuring the PF 910. The VFs 920 include VF configuration registers (VF CFG REG) 921 (921-1, 921-2, ..., 921-N) for configuring the VFs 920.

The virtualization bridge 800 provides the plurality of operational computers 700 with virtual functions of the I/O device 900. The virtualization bridge 800 allocates VF map areas for performing memory access to the VFs 920 in an I/O address space. The virtualization bridge 800 also provides the operational computers 700 with access to virtual VF CFG REGs 821 (821-1, 821-2, ..., 821-N), into which the VF CFG REGs 921 are virtualized.

Each operational computer 700 allocates a virtual VF map area in an address space in the operational computer 700 and sets the allocated virtual VF map area into a virtual VF CFG REG 821.

The virtualization bridge 800 provides the plurality of operational computers 700 with memory access to the VFs 920 by performing address translation between the address spaces in the operational computers 700 and the I/O address space on the basis of the virtual VF CFG REGs 821.

Further, in such an I/O system, making a computer different from the virtualization bridge 800 perform control intrinsic to the I/O device 900 makes it possible to simplify the management of the I/O device 900 in the virtualization bridge 800.

FIG. 18 is a block diagram illustrating a configuration of a system that is configured by adding a management computer 600 to the I/O system in PTL1.

In FIG. 18, the virtualization bridge 800 allocates a PF map area for performing memory access to the PF 910 in the I/O address space. The virtualization bridge 800 also provides the management computer 600 with access to a virtual PF CFG REG 811 into which the PF CFG REG 911 is virtualized.

The management computer 600 allocates a virtual PF map area in an address space in the management computer 600 and sets the allocated virtual PF map area into the virtual PF CFG REG 811.

The virtualization bridge 800 provides the management computer 600 with memory access to the PF 910 by performing address translation between the address space in the management computer 600 and the I/O address space on the basis of the virtual PF CFG REG 811.

CITATION LIST

Patent Literature

[PTL1] WO2009/025381

SUMMARY OF INVENTION

Technical Problem

However, in the case of managing the settings of the I/O device 900 by using the management computer 600 as described above, a failure in the management computer 600 influences the operational computers 700.

For example, when a failure in the management computer 600 is detected in the virtualization bridge 800, the virtualization bridge 800 is not able to guarantee the control of the I/O device 900. Thus, the virtualization bridge 800 cuts connections to the operational computers 700 and resets the I/O device 900. In consequence, when a failure occurs to the management computer 600, the operational computers 700 become unable to access the I/O device 900.

An object of the present invention is to solve the above-described problem and to provide an information processing device, an I/O system, and an I/O control method that are capable of continuing access to an I/O device by operational computers even when a failure has occurred in a management computer.

Solution to Problem

An information processing device for providing a virtual function of an I/O device to a computer according to an exemplary aspect of the invention includes: a monitoring means for detecting a failure in a management computer which controls the I/O device through the information processing device; and a backup control means for generating backup management information on the basis of packets transmitted and received between the management computer and the I/O device, the backup management information being information on the I/O device and required to control the I/O device in place of the management computer, and controlling the I/O device in place of the management computer on the basis of the backup management information when a failure in the management computer is detected by the monitoring means.

An I/O system according to an exemplary aspect of the invention includes: an I/O device; an information processing device that provides a virtual function of the I/O device to a computer; and a management computer that controls the I/O device through the information processing device, wherein the information processing device includes: a monitoring means for detecting a failure in the management computer; and a backup control means for generating backup management information on the basis of packets transmitted and received between the management computer and the I/O device, the backup management information being information on the I/O device and required to control the I/O device in place of the management computer, and controlling the I/O device in place of the management computer on the basis of the backup management information when a failure in the management computer is detected by the monitoring means.

An I/O control method of information processing device for providing a virtual function of an I/O device to a computer according to an exemplary aspect of the invention includes: detecting a failure in a management computer which controls the I/O device through the information processing device; generating backup management information on the basis of packets transmitted and received between the management computer and the I/O device, the backup management information being information on the I/O device and required to control the I/O device in place of the management computer; and controlling the I/O device in place of the management computer on the basis of the backup management information when a failure in the management computer is detected by the monitoring means.

A computer readable storage medium according to an exemplary aspect of the invention records thereon a program executed on information processing device for providing a virtual function of an I/O device to a computer, the program causing a computer to execute processes including: detecting a failure in a management computer which controls the I/O device through the information processing device; generating backup management information on the basis of packets transmitted and received between the management computer and the I/O device, the backup management information being information on the I/O device and required to control the I/O device in place of the management computer; and controlling the I/O device in place of the management computer on the basis of the backup management information when a failure in the management computer is detected by the monitoring means.

Advantageous Effects of Invention

The present invention has an advantageous effect that, even when a failure has occurred to a management computer, it is possible to continue access to an I/O device by operational computers.

BRIEF DESCRIPTION OF DRAWINGS

FIG. 4 is a diagram illustrating an example of a PF CFG REG 411 in the first exemplary embodiment of the present invention;

FIG. 5 is a diagram illustrating an example of a VF CFG REG 421 in the first exemplary embodiment of the present invention;

FIG. 6 is a diagram illustrating an example of management information 111 in the first exemplary embodiment of the present invention;

FIG. 7 is a diagram illustrating an example of a virtual PF CFG REG 311 in the first exemplary embodiment of the present invention;

FIG. 8 is a diagram illustrating an example of a virtual VF CFG REG 321 in the first exemplary embodiment of the present invention;

FIG. 9 is a diagram illustrating an example of duplication target information 331 in the first exemplary embodiment of the present invention;

FIG. 10 is a diagram illustrating an example of backup management information 341 in the first exemplary embodiment of the present invention;

DESCRIPTION OF EMBODIMENTS

First Exemplary Embodiment

A first exemplary embodiment of the present invention will be described.

First, a configuration of the first exemplary embodiment of the present invention will be described.

Figure 2:
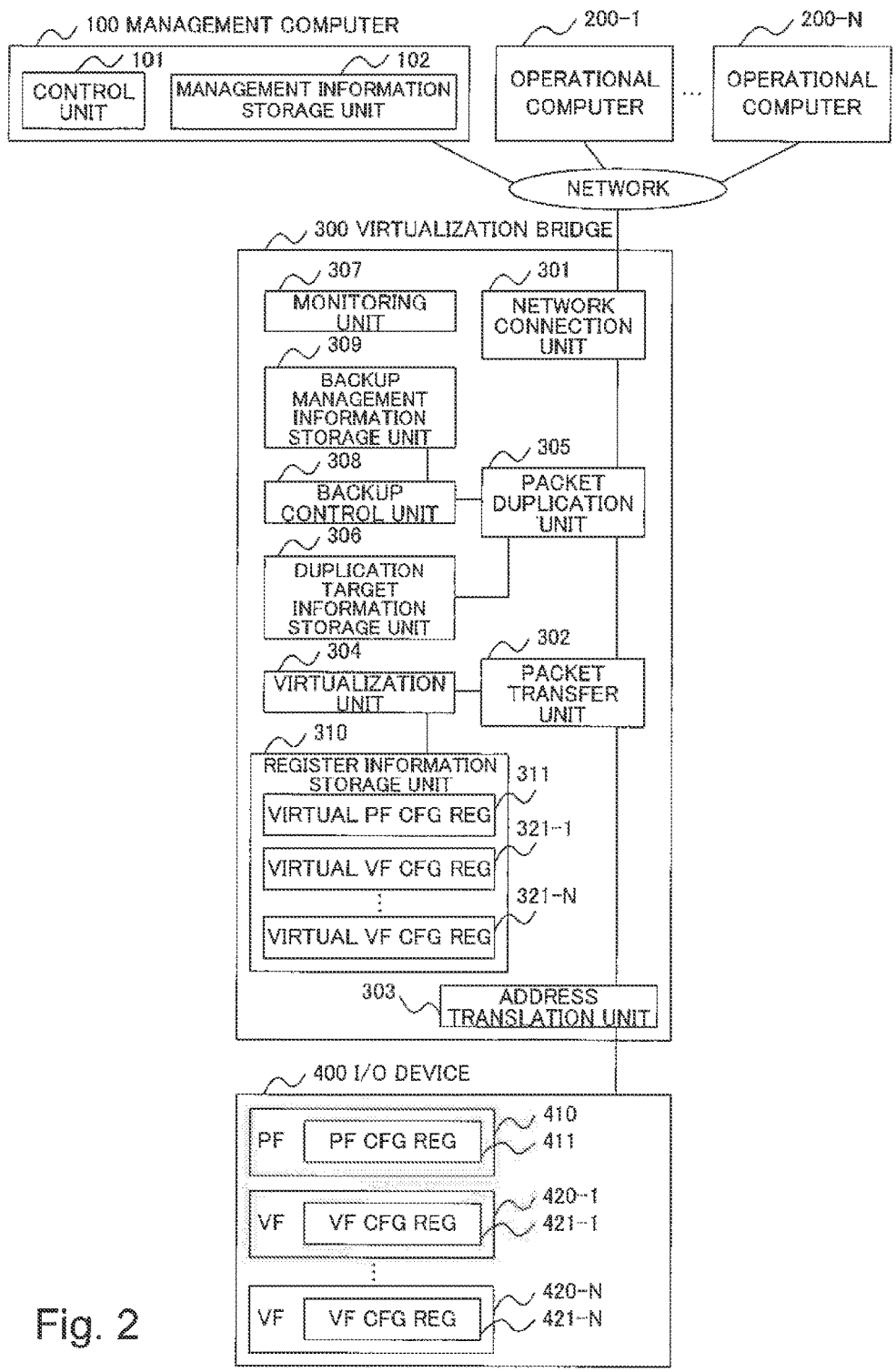
FIG. 2 is a block diagram illustrating a configuration of an I/O system in the first exemplary embodiment of the present invention.

FIG. 2 is a block diagram illustrating a configuration of an I/O system in the first exemplary embodiment of the present invention.

Referring to FIG. 2, the I/O system includes a management computer 100, operational computers (or simply computers) 200 (200-1, 200-2, ..., 200-N) (N is an integer equal to or greater than 1), an I/O device 400, and a virtualization bridge 300 (or an information processing device). The management computer 100 and the operational computers 200 are connected to the virtualization bridge 300 via a network. The virtualization bridge 300 is connected to the I/O device 400.

The virtualization bridge 300 is an exemplary embodiment of the information processing device of the present invention.

The I/O device 400 is a device that provides a physical function, such as a storage medium and a network interface, as a plurality of virtual functions. The I/O device 400 conforms to, for example, the SR-IOV standard. The I/O device 400 includes a PF (or a control function) 410 and a plurality of VFs (or virtual functions) 420 (420-1, 420-2, . . . , 420-N).

The PF 410 is an interface for controlling the I/O device 400. The VFs 420 (420-1, 420-2, . . . , 420-N) are interfaces for providing functions of the I/O device 400 through virtualization. The VFs 420-1, 420-2, . . . , 420-N are associated with the operational computers 200-1, 200-2, . . . , 200-N, respectively.

The PF 410 includes a PF CFG REG 411 with which the PF 410 is configured. The VFs 420 include VF CFG REGs 421 (421-1, 421-2, . . . , 421-N) with which the VFs 420 are configured.

Access to the I/O device 400 is transferred by packets, such as packets defined in the PCI Express specification (hereinafter, referred to as PCIe packets). Types of packet include a configuration packet and a memory access packet. The configuration packet is a packet for accessing a register, such as the PF CFG REG 411 and the VF CFG REGs 421, (configuration access). The configuration packets include a configuration read request and response and a configuration write request and response. The memory access packet is a packet for performing access by specifying an address (memory access) in a map area that is allocated to the PF 410 or a VF 420 in an address space. The memory access packets include a memory read request and response and a memory write request and response.

Figure 3:
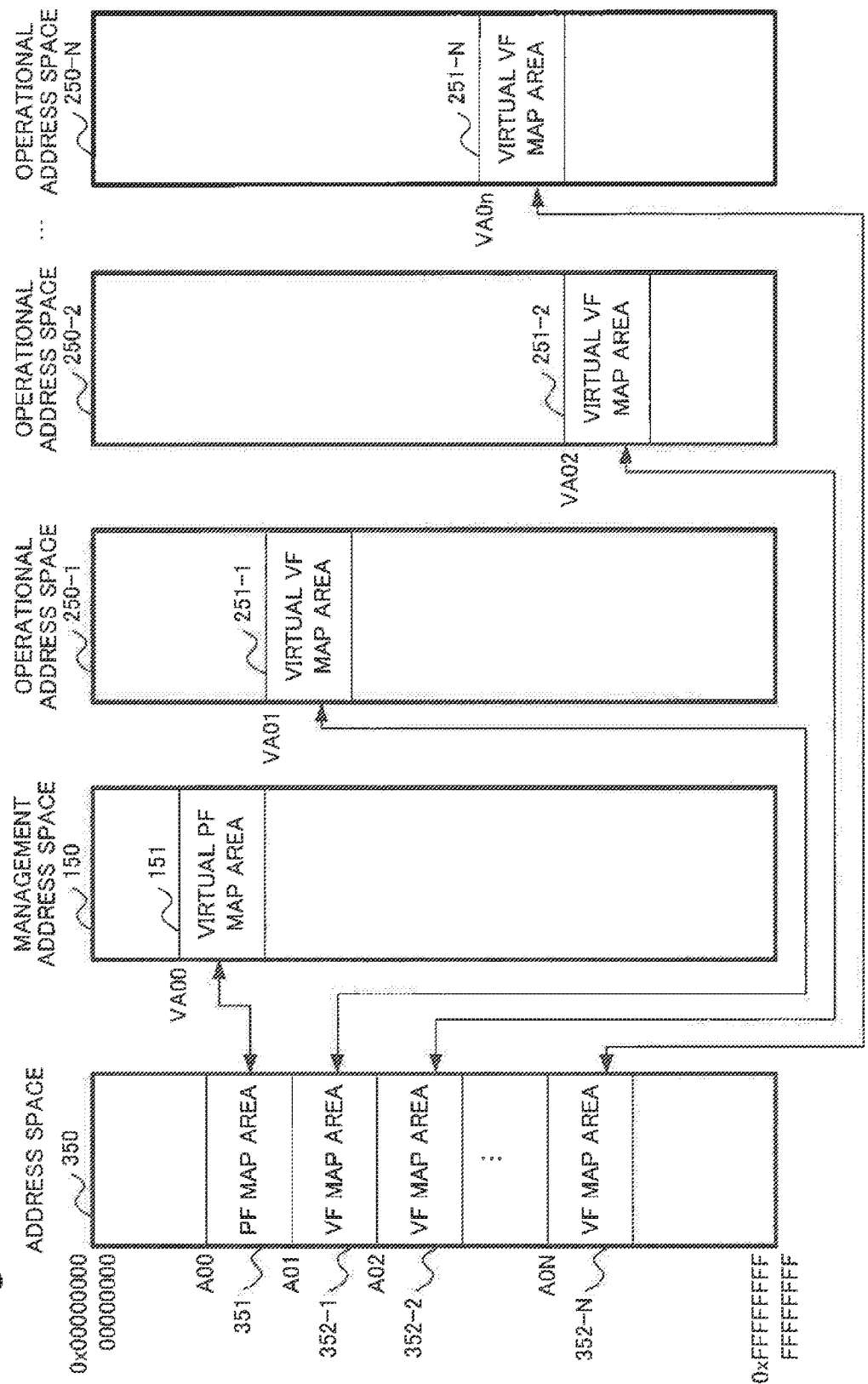
FIG. 3 is a diagram illustrating relations between address spaces related to an I/O device 400 in the first exemplary embodiment of the present invention.

FIG. 3 is a diagram illustrating relations between address spaces related to the I/O device 400 in the first exemplary embodiment of the present invention. As illustrated in FIG. 3, in an address space for the I/O device 400 in the virtualization bridge 300 (I/O address space 350), a PF map area 351 and VF map areas 352 (352-1, 352-2, . . . , 352-N) are allocated. The PF map area 351 and the VF map areas 352 (352-1, 352-2, . . . , 352-N) are address spaces for the virtualization bridge 300 to perform memory access to the PF 410 and the respective VFs 420, respectively. In an address space for the I/O device 400 in the management computer 100 (management address space 150), a virtual PF map area 151 is allocated. The virtual PF map area 151 is an address space for the management computer 100 to perform memory access to the PF 410 through the virtualization bridge 300. In address spaces for the I/O device 400 in the respective operational computers 200 (operational address spaces 250 (250-1, 250-2, . . . , 250-N)), virtual VF map areas 251 (251-1, 251-2, . . . , 251-N) are allocated. The virtual VF map areas 251 (251-1, 251-2, . . . , 251-N) are address spaces for the respective operational computers 200 to perform memory access to the VFs 420 through the virtualization bridge 300.

FIG. 4 is a diagram illustrating an example of the PF CFG REG 411 in the first exemplary embodiment of the present invention. As illustrated in FIG. 4, the PF CFG REG 411 includes a VF enable flag, the maximum number of VFs, the number of VFs, VF reset flags, a PF area size, and PF map area information.

The VF enable flag above is a control flag for enabling the VFs 420. When "Enable" is set to the VF enable flag, the I/O device 400 provides the VFs 420 to the operational computers 200. The maximum number of VFs indicates the number of VFs 420 that are available in the I/O device 400. The number of VFs indicates the number of VFs 420 that are provided to the operational computers 200. The VF reset flags are control flags for resetting (reactivating) the respective VFs 420. When "Reset" is set to a VF reset flag, the I/O device 400 resets (reactivates) the corresponding VF 420. The PF area size indicates the size of the PF map area 351 that the PF 410 requires. The PF map area information indicates the address (lower limit address) of the PF map area 351.

FIG. 5 is a diagram illustrating an example of the VF CFG REGs 421 in the first exemplary embodiment of the present invention. As illustrated in FIG. 5, each VF CFG REG 421 includes a VF area size and VF map area information.

The VF area size above indicates the size of a VF map area 352 that a VF 420 requires. The VF map area information indicates the address (lower limit address) of the VF map area 352.

To the maximum number of VFs, the PF area size, and the VF area sizes, predetermined values are set in advance in accordance with, for example, specifications of the I/O device 400.

The management computer 100 controls the I/O device 400 through the virtualization bridge 300. The management computer 100 includes a control unit 101 and a management information storage unit 102.

The control unit 101 controls the I/O device 400 through configuration access to the PF CFG REG 411 and memory access to the PF 410. The control unit 101 may be achieved, for example, by a program provided by the manufacturer or the like of the I/O device 400. The control unit 101 controls the I/O device 400 using management information 111. The management information 111 is information required for controlling the I/O device 400, such as various settings for the I/O device 400 and various states of the I/O device 400.

The management information storage unit 102 stores the management information 111.

FIG. 6 is a diagram illustrating an example of the management information 111 in the first exemplary embodiment of the present invention. The management information 111 in FIG. 6 illustrates an example of information required for alive management of the VFs 420. In FIG. 6, the management information 111 includes a VF enable flag, the number of VFs, and VF states. Each VF state indicates the state ("abnormal" or "normal") of each VF.

Each operational computer 200 uses the VF 420 associated with the operational computer 200 through the virtualization bridge 300. The operational computers 200 uses the VFs 420 through configuration access to the VF CFG REGs 421 and memory access to the VFs 420.

The virtualization bridge 300 provides the plurality of operational computers 200 with virtual functions of the I/O device 400. The virtualization bridge 300 provides the management computer 100 with configuration access and memory access to the PF 410, and provides the plurality of operational computers 200 with configuration access and memory access to the VFs 420.

The virtualization bridge 300 includes a network connection unit 301, a packet transfer unit 302, an address translation unit 303, a virtualization unit 304, a packet duplication unit 305, a duplication target information storage unit 306, a monitoring unit 307, a backup control unit 308, a backup management information storage unit 309, and a register information storage unit 310. The register information storage unit 310 stores a virtual PF CFG REG 311 and virtual VF CFG REGs 321 (321-1, 321-2, . . . , 321-N). The virtual VF CFG REGs 321-1, 321-2, . . . , 321-N correspond to the VF CFG REGs 421-1, 421-2, . . . , 421-N, respectively.

The network connection unit 301 decapsulates encapsulated packets received from the management computer 100 or the operational computers 200. The network connection unit 301 encapsulates packets and transmits the encapsulated packets to the management computer 100 or the operational computers 200.

The packet transfer unit 302 transfers configuration packets between either of the management computer 100, the operational computers 200, and the backup control unit 308 and the virtualization unit 304 or between the virtualization unit 304 and the I/O device 400. The packet transfer unit 302 also transfers memory access packets between either of the management computer 100, the operational computers 200, and the backup control unit 308 and the I/O device 400.

The virtualization unit 304 performs configuration of the PF 410 using the PF CFG REG 411. The virtualization unit 304 allocates the PF map area 351 and the VF map areas 352 in the I/O address space 350. The virtualization unit 304 provides the management computer 100 and the operational computers 200 with configuration access to the virtual PF CFG REG 311 and the virtual VF CFG REGs 321, into which the PF CFG REG 411 and the VF CFG REGs 421 are virtualized, respectively.

FIG. 7 is a diagram illustrating an example of the virtual PF CFG REG 311 in the first exemplary embodiment of the present invention. As illustrated in FIG. 7, the virtual PF CFG REG 311 includes virtual PF map area information in addition to a VF enable flag, the maximum number of VFs, the number of VFs, VF reset flags, a PF area size, and PF map area information, which are the same as those in the PF CFG REG 411.

The virtual PF map area information above indicates the address (lower limit address) of the virtual PF map area 151.

FIG. 8 is a diagram illustrating an example of the virtual VF CFG REGs 321 in the first exemplary embodiment of the present invention. As illustrated in FIG. 8, each virtual VF CFG REG 321 includes virtual VF map area information in addition to a VF area size and VF map area information, which are the same as those in the VF CFG REG 421.

The virtual VF map area information above indicates the address (lower limit address) of the virtual VF map area 251.

The address translation unit 303 translates addresses of memory access packets between either of the management address space 150 and the operational address spaces 250 and the I/O address space 350.

The monitoring unit 307 monitors the state of the control unit 101 of the management computer 100 to detect a failure in the control unit 101. Failure in the control unit 101 includes hardware failure in the management computer 100, software failure in a program that achieves the control unit 101, failure in the network between the management computer 100 and the virtualization bridge 300, or the like.

As a method of monitoring, either active-type or passive-type monitoring can be used.

In the active-type monitoring, the monitoring unit 307 accesses the control unit 101 regularly and confirms whether or not a failure has occurred in the control unit 101.

In the passive-type monitoring, the monitoring unit 307 monitors a failure notification from the management computer 100 or the control unit 101 of the management computer 100. In this case, types of failure notification that the monitoring unit 307 monitors include, for example, hardware failure, software failure, network failure, or the like. Hardware failure is detected through, for example, a reset interrupt from the management computer 100, an error interrupt caused by a PCIe packet, a CRC error, or the like. Software failure is detected through, for example, a reset notification from the control unit 101, or the like. Network failure is detected through, for example, a packet loss ratio, an interrupt caused by detecting a network shutdown, or the like.

The packet duplication unit 305 duplicates packets transferred between the management computer 100 and either the virtualization unit 304 or the I/O device 400 in accordance with duplication target information 331, and transmits the duplicated packets to the backup control unit 308. The packet duplication unit 305 may duplicate only packets that the backup control unit 308 requires and transmit the duplicated packets to the backup control unit 308.

The duplication target information storage unit 306 stores the duplication target information 331, which indicates packets required to be duplicated.

FIG. 9 is a diagram illustrating an example of the duplication target information 331 in the first exemplary embodiment of the present invention. As illustrated in FIG. 9, the duplication target information 331 includes duplication conditions that indicate types of packets that are targets for duplication. The duplication conditions are set so that packets required for the backup control unit 308 to generate backup management information 341, which will be described later, are duplicated.

When a failure in the control unit 101 is detected by the monitoring unit 307, the backup control unit 308 controls the I/O device 400 in place of the control unit 101 (substitutes for control processing of the control unit 101). The backup control unit 308 may perform the same control processing as the control unit 101 or only control processing required for making the I/O device 400 operate continuously among the control processing that the control unit 101 performs.

The backup control unit 308 updates the backup management information 341 on the basis of packets duplicated by the packet duplication unit 305 and controls the I/O device 400 using the backup management information 341. The backup management information 341 is information required for the control processing for which the backup management information 341 substitutes, among information equivalent to the management information 111. On the basis of the duplicated packets, the backup control unit 308 updates the backup management information 341 so that the content of the backup management information 341 coincides with the content of the management information 111.

By referring to the virtual PF CFG REG 311 and analyzing memory access performed in the virtual PF map area 151 by the management computer 100, the packet duplication unit 305 and the backup control unit 308 perform duplication of packets and update of the backup management information 341. In the case of performing memory access to the I/O device 400, the backup control unit 308 performs the memory access in the PF map area 351 with reference to the virtual PF CFG REG 311.

As with the control unit 101, the backup control unit 308 may be achieved, for example, by a program provided by the manufacturer or the like of the I/O device 400. In this case, the duplication target information 331 is also provided by the manufacturer of the I/O device 400.

The backup management information storage unit 309 stores the backup management information 341.

FIG. 10 is a diagram illustrating an example of the backup management information 341 in the first exemplary embodiment of the present invention. As illustrated in FIG. 10, the backup management information 341 includes a VF enable flag, the number of VFs, and VF states. The VF enable flag, the number of VFs, and the VF states are updated so as to be the same as the VF enable flag, the number of VFs, and the VF states in the management information 111.

The virtualization bridge 300 may be a computer that includes a CPU (Central Processing Unit) and a storage medium storing a program and operates by control on the basis of the program. The duplication target information storage unit 306, the backup management information storage unit 309, and the register information storage unit 310 may be separate storage media or be configured with a single storage medium.

Next, an operation of the first exemplary embodiment of the present invention will be described.

In the following description, it is assumed that the maximum number of VFs and the PF area size in the PF CFG REG 411 as illustrated in FIG. 4 and the VF area sizes in the VF CFG REGs 421 as illustrated in FIG. 5 are set in the I/O device 400. It is also assumed that the duplication target information 331 as illustrated in FIG. 9 is set.

<Activation Processing of Virtualization Bridge 300>

First, activation processing of the virtualization bridge 300 in the first exemplary embodiment of the present invention will be described.

Figure 11:
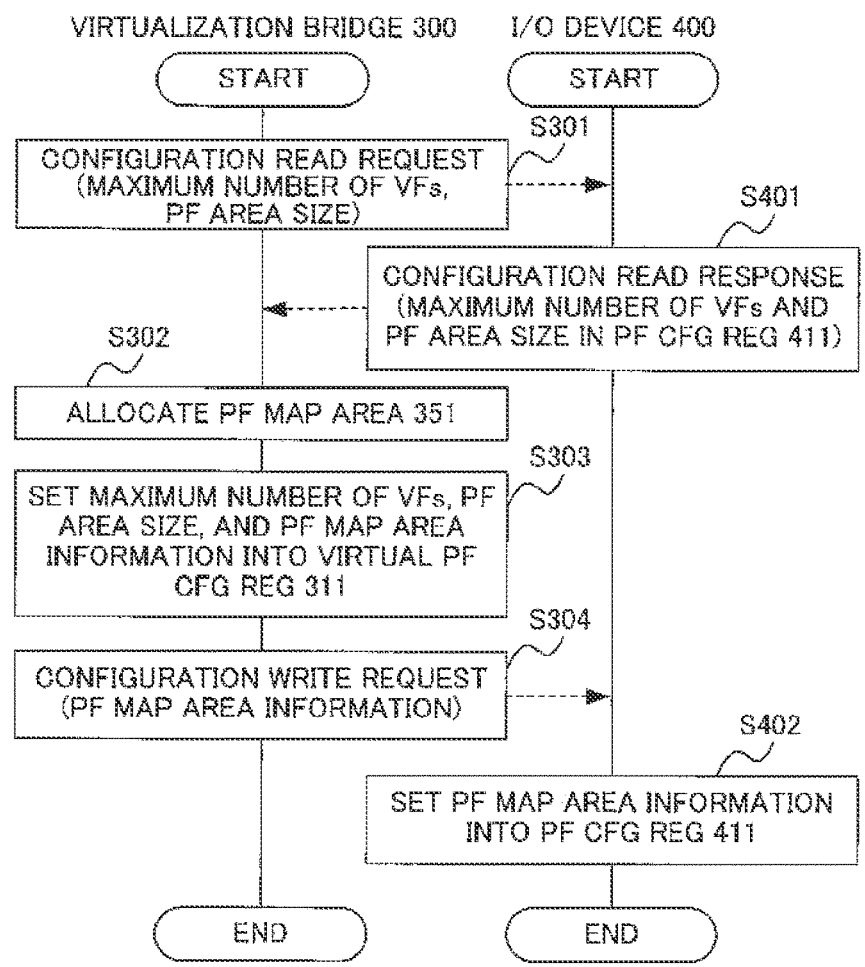
FIG. 11 is a flowchart illustrating activation processing of a virtualization bridge 300 in the first exemplary embodiment of the present invention.

FIG. 11 is a flowchart illustrating the activation processing of the virtualization bridge 300 in the first exemplary embodiment of the present invention.

First, the virtualization unit 304 of the virtualization bridge 300 requests the I/O device 400 to read the maximum number of VFs and a PF area size using a configuration read request (step S301).

The I/O device 400 returns the maximum number of VFs and the PF area size in the PF CFG REG 411 to the virtualization bridge 300 using a configuration read response (step S401).

For example, the I/O device 400 returns the maximum number of VFs "N" and a PF area size "Spf" in the PF CFG REG 411 in FIG. 4.

The virtualization unit 304 allocates a PF map area 351 of the PF area size in the I/O address space 350 (step S302).

For example, the virtualization unit 304 allocates the PF map area 351 in the I/O address space 350 as illustrated in FIG. 3.

The virtualization unit 304 sets the maximum number of VFs, the PF area size, and PF map area information on the PF map area 351 into the virtual PF CFG REG 311 (step S303).

For example, the virtualization unit 304 sets the maximum number of VFs "N", the PF area size "Spf", and PF map area information "A00" into the virtual PF CFG REG 311 as illustrated in FIG. 7.

The virtualization unit 304 requests the I/O device 400 to write the PF map area information using a configuration write request (step S304).

The I/O device 400 sets the PF map area information into the PF CFG REG 411 (step S402).

For example, the I/O device 400 sets the PF map area information "A00" into the PF CFG REG 411 as illustrated in FIG. 4.

<Setup Processing by Management Computer 100>

Next, setup processing by the management computer 100 in the first exemplary embodiment of the present invention will be described.

Figure 12:
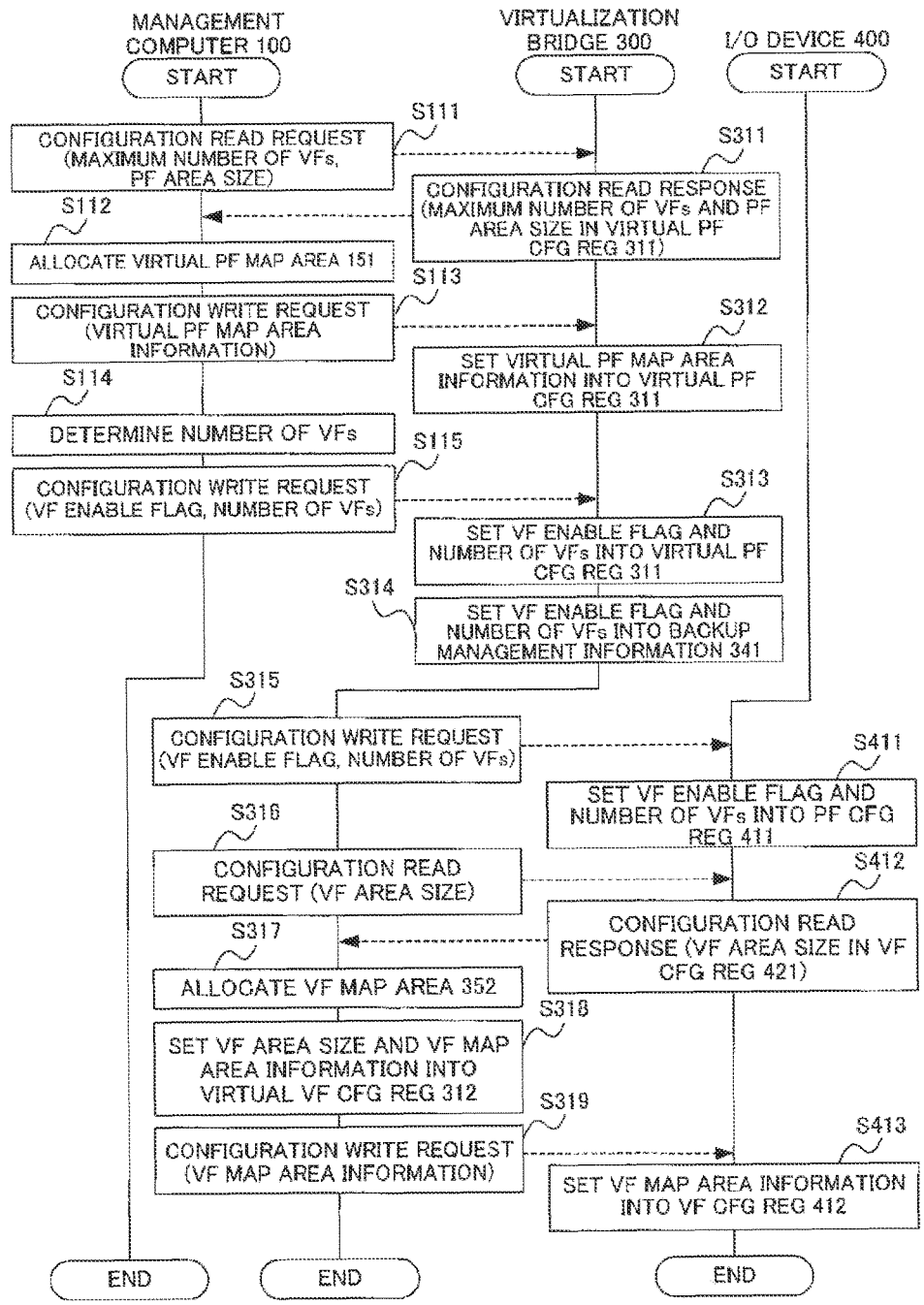
FIG. 12 is a flowchart illustrating setup processing of a management computer 100 in the first exemplary embodiment of the present invention.

FIG. 12 is a flowchart illustrating the setup processing by the management computer 100 in the first exemplary embodiment of the present invention.

First, the control unit 101 of the management computer 100 requests the virtualization bridge 300 to read the maximum number of VFs and the PF area size using a configuration read request (step S111). The configuration read request is transferred to the virtualization unit 304 by the packet transfer unit 302.

The virtualization unit 304 returns the maximum number of VFs and the PF area size in the virtual PF CFG REG 311 to the management computer 100 using a configuration read response (step S311). The configuration read response is transferred to the network connection unit 301 by the packet transfer unit 302 and transmitted to the management computer 100.

For example, the virtualization unit 304 returns the maximum number of VFs "N" and the PF area size "Spf" in the virtual PF CFG REG 311 in FIG. 7.

The control unit 101 allocates a virtual PF map area 151 in the management address space 150 (step S112).

For example, the control unit 101 allocates the virtual PF map area 151 in the management address space 150 as illustrated in FIG. 3.

The control unit 101 requests the virtualization bridge 300 to write virtual PF map area information on the virtual PF map area 151 using a configuration write request (step S113).

For example, the control unit 101 requests writing of virtual PF map area information "VA00".

The virtualization unit 304 sets the virtual PF map area information into the virtual PF CFG REG 311 (step S312).

For example, the virtualization unit 304 sets the virtual PF map area information "VA00" into the virtual PF CFG REG 311 as illustrated in FIG. 7.

Next, the control unit 101 determines the number of VFs within a range of the maximum number of VFs, and sets a VF enable flag and the number of VFs into the management information 111 (step S114).

For example, the control unit 101 sets a VF enable flag "Enable" and the number of VFs "N" into the management information 111 as illustrated in FIG. 6.

The control unit 101 requests the virtualization bridge 300 to write the VF enable flag and the number of VFs using a configuration write request (step S115).

The virtualization unit 304 sets the VF enable flag and the number of VFs into the virtual PF CFG REG 311 (step S313).

For example, the virtualization unit 304 sets the VF enable flag "Enable" and the number of VFs "N" into the virtual PF CFG REG 311 as illustrated in FIG. 7.

Since the configuration write request (a VF enable flag, the number of VFs) above is a target for duplication, the packet duplication unit 305 duplicates the configuration write request and transmits the duplicated configuration write request to the backup control unit 308. On the basis of the duplicated configuration write request, the backup control unit 308 sets the VF enable flag and the number of VFs into the backup management information 341 (step S314).

For example, the backup control unit 308 sets the VF enable flag "Enable" and the number of VFs "N" into the backup management information 341 as illustrated in FIG. 10.

The virtualization unit 304 requests the I/O device 400 to write the VF enable flag and the number of VFs using a configuration write request (step S315).

The I/O device 400 sets the VF enable flag and the number of VFs into the PF CFG REG 411 (step S411).

For example, the I/O device 400 sets the VF enable flag "Enable" and the number of VFs "N" into the PF CFG REG 411 as illustrated in FIG. 4.

The virtualization unit 304 requests the I/O device 400 to read VF area sizes of VFs for the number of VFs using a configuration read request (step S316).

The I/O device 400 returns the VF area sizes in the respective VF CFG REGs 421 to the virtualization bridge 300 using a configuration read response (step S412).

For example, the I/O device 400 returns VF area sizes "Svf1", ..., "SvfN" in the VF CFG REGs 421 in FIG. 5.

The virtualization unit 304 allocates VF map areas 352 of the respective VF area sizes in the I/O address space 350 (step S317).

For example, the virtualization unit 304 allocates VF map areas 352-1 to 352-N in the I/O address space 350 as illustrated in FIG. 3.

The virtualization unit 304 sets the VF area sizes and VF map area information on the VF map areas 352 into the respective virtual VF CFG REGs 321 (step S318).

For example, the virtualization unit 304 sets the VF area sizes "Svf1", ..., "SvfN" and VF map area information "A01", ..., "A0n" into the respective virtual VF CFG REGs 321 as illustrated in FIG. 8.

The virtualization unit 304 requests the I/O device 400 to write the VF map area information using a configuration write request (step S319).

The I/O device 400 sets the VF map area information into the respective VF CFG REGs 421 (step S413).

For example, the I/O device 400 sets the VF map area information "A01", ..., "A0n" into the respective VF CFG REGs 421 as illustrated in FIG. 5.

Consequently, use of the VFs 420 by the operational computers 200 becomes possible.

The operational computers 200, as with PTL1, allocate the virtual VF map areas 251 of the VF area sizes in the operational address spaces 250. The virtualization unit 304 sets the virtual VF map area information into the virtual VF CFG REGs 321. The address translation unit 303 translates addresses of memory access packets between the operational computers 200 and the VFs 420. The address translation unit 303 translates addresses between the virtual VF map areas 251 of the operational computers 200 and the VF map areas 352 on the basis of the virtual VF CFG REGs 321.

<Control Processing by Management Computer 100>

Next, control processing by the management computer 100 in the first exemplary embodiment of the present invention will be described. The following description will be made by using, as an example, a case in which alive management of the VFs 420 is performed as the control processing.

In the first exemplary embodiment of the present invention, it is assumed that the VF states of the respective VFs 420 can be acquired from the PF map area 351 corresponding to the PF 410.

Figure 13:
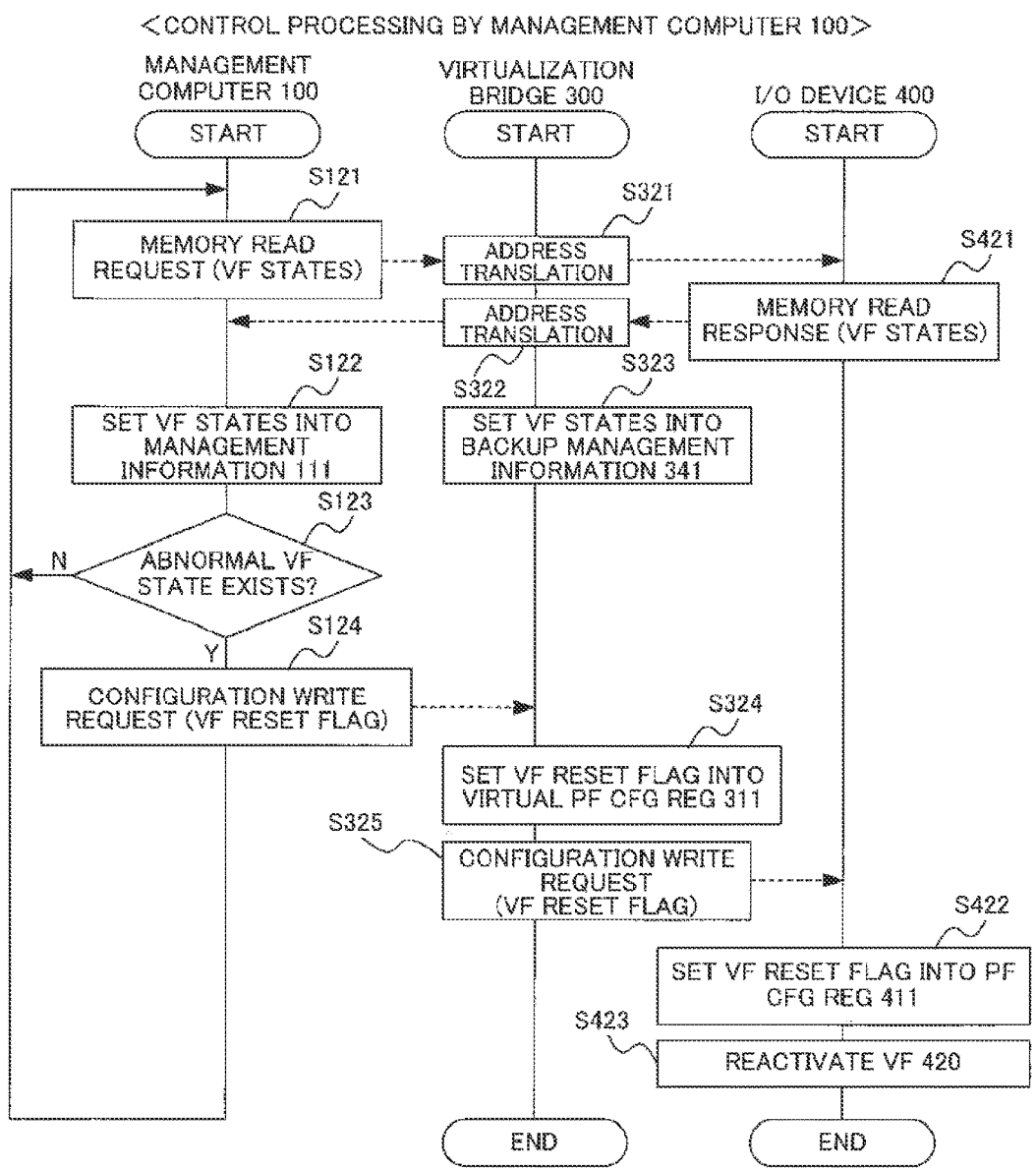
FIG. 13 is a flowchart illustrating control processing by the management computer 100 in the first exemplary embodiment of the present invention.

FIG. 13 is a flowchart illustrating the control processing by the management computer 100 in the first exemplary embodiment of the present invention.

First, the control unit 101 of the management computer 100 requests the virtualization bridge 300 to read VF states in the PF map area 351 using a memory read request (step S121). At this time, with reference to the management information 111, the management computer 100 requests reading of the VF states of the VFs 420 for the number of VFs.

For example, with reference to the management information 111 in FIG. 6, the control unit 101 requests reading of the VF states of the VFs 420-1 to 420-N.

The memory read request is transferred to the address translation unit 303 by the packet transfer unit 302. The address translation unit 303 translates addresses in the virtual PF map area 151 in the memory read request received from the management computer 100 to addresses in the PF map area 351, on the basis of the virtual PF CFG REG 311. The address translation unit 303 then transmits the memory read request to the I/O device 400 (step S321).

The I/O device 400 returns the VF states in the PF map area 351 to the virtualization bridge 300 using a memory read response (step S421).

The address translation unit 303 translates addresses in the PF map area 351 in the memory read response received from the I/O device 400 to addresses in the virtual PF map area 151, on the basis of the virtual PF CFG REG 311. The address translation unit 303 then transmits the memory read response to the packet transfer unit 302 (step S322). The memory read response is transferred to the network connection unit 301 by the packet transfer unit 302 and transmitted to the management computer 100.

At this time, since, in the duplication target information 331, a memory read response (VF states) is also a target for duplication, the packet duplication unit 305 duplicates the memory read response and transmits the duplicated memory read response to the backup control unit 308. The backup control unit 308 sets the VF states into the backup management information 341 on the basis of the duplicated memory read response (step S323).

For example, the backup control unit 308 sets the VF states of the VFs 420-1 to 420-N into the backup management information 341 as illustrated in FIG. 10.

The control unit 101 sets the received VF states into the management information 111 (step S122).

For example, the control unit 101 sets the VF states of the VFs 420-1 to 420-N into the management information 111 as illustrated in FIG. 6.

The control unit 101 judges whether or not a VF 420 having VF state "abnormal" exists (step S123).

When no VF 420 having VF state "abnormal" exists in step S123 (N in step S123), the processing from step S121 is performed regularly.

When a VF(s) 420 having VF state(s) "abnormal" exist(s) in step S123 (Y in step S123), the control unit 101 requests the virtualization bridge 300 to write a VF reset flag(s) "Reset" using a configuration write request (step S124). In the configuration write request, the VF(s) 420 that has/have been detected to be abnormal is/are specified.

For example, the control unit 101 requests writing of a VF reset flag "Reset" for the VF 420-1.

The virtualization unit 304 sets the VF reset flag(s) for the specified VF(s) 420 in the virtual PF CFG REG 311 (step S324).

For example, the virtualization unit 304 sets the VF reset flag "Reset" for the VF 420-1 in the virtual PF CFG REG 311 as illustrated in FIG. 7.

The virtualization unit 304 requests the I/O device 400 to write the VF reset flag(s) for the specified VF(s) 420 using a configuration write request (step S325).

The I/O device 400 sets the VF reset flag(s) for the specified VF(s) 420 in the PF CFG REG 411 (step S422). With this processing, the I/O device 400 performs reactivation of the VF(s) 420 that has/have been detected to be abnormal (step S423).

For example, the I/O device 400 sets the VF reset flag "Reset" for the VF 420-1 in the PF CFG REG 411 as illustrated in FIG. 4. The I/O device 400 reactivates the VF 420-1.

When the reactivation of the VF(s) 420 has been completed, the virtualization unit 304 performs allocation of a VF map area(s) 352 and setup of VF map area information with respect to the reactivated VF(s) 420 through processing similar to the processing in steps S316 to S319. With this processing, use of the reactivated VF(s) 420 by the operational computer(s) 200 becomes possible.

Subsequently, the processing from step S121 is performed repeatedly.

<Monitoring Processing of Management Computer 100>

Next, monitoring processing of the control unit 101 of the management computer 100 in the first exemplary embodiment of the present invention will be described.

The monitoring processing is started when, for example, a program that achieves the control unit 101 in the management computer 100 is activated, or first access from the control unit 101 to the virtualization bridge 300 occurs.

Figure 14:
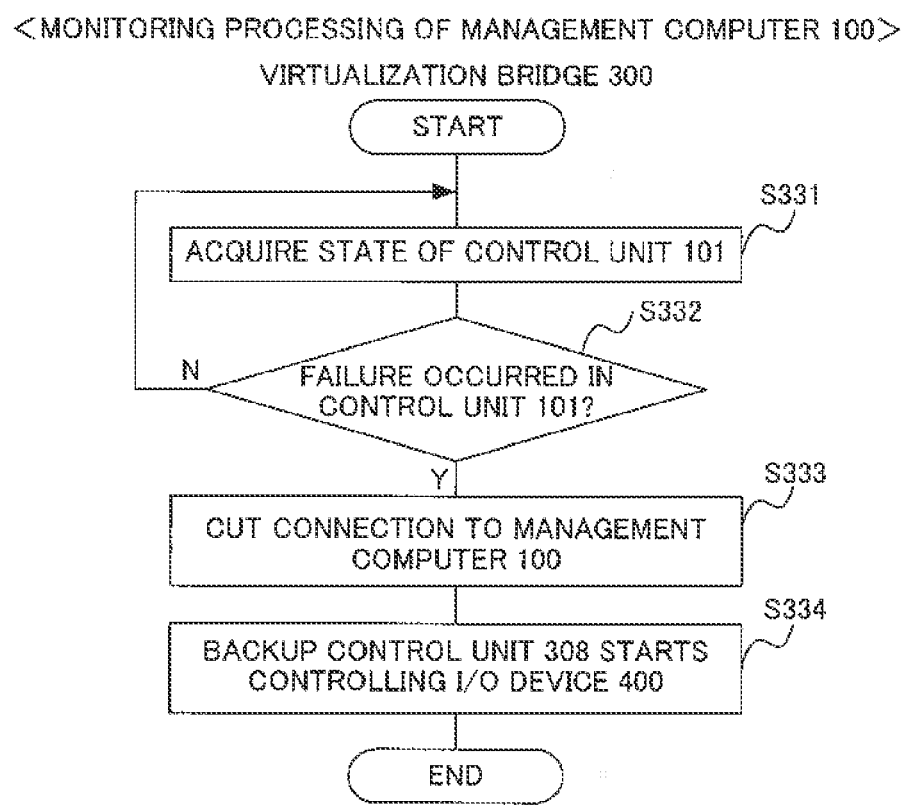
FIG. 14 is a flowchart illustrating monitoring processing of the management computer 100 in the first exemplary embodiment of the present invention.

FIG. 14 is a flowchart illustrating the monitoring processing of the management computer 100 in the first exemplary embodiment of the present invention.

First, the monitoring unit 307 acquires the state of the control unit 101 (step S331).

The monitoring unit 307 judges whether or not a failure has occurred to the control unit 101 (step S332).

When, in step S332, it is judged that no failure has occurred to the control unit 101 (N in step S332), the processing from step S331 is repeated.

When, in step S332, it is judged that a failure has occurred to the control unit 101 (Y in step S332), the monitoring unit 307 cuts connection to the management computer 100 (step S333). The monitoring unit 307 also notifies the backup control unit 308 of the failure in the control unit 101. With this processing, the backup control unit 308 starts controlling the I/O device 400 in place of the control unit 101 (step S334).

<Control Processing by Backup Control Unit 308>

Next, control processing by the backup control unit 308 in the first exemplary embodiment of the present invention will be described. The following description will be made by using, as an example, a case in which the backup control unit 308 performs alive management of the VFs 420 as the control processing.

The control processing by the backup control unit 308 is started when a failure in the control unit 101 is detected by the monitoring unit 307 as in the afore-described step S332.

Figure 15:
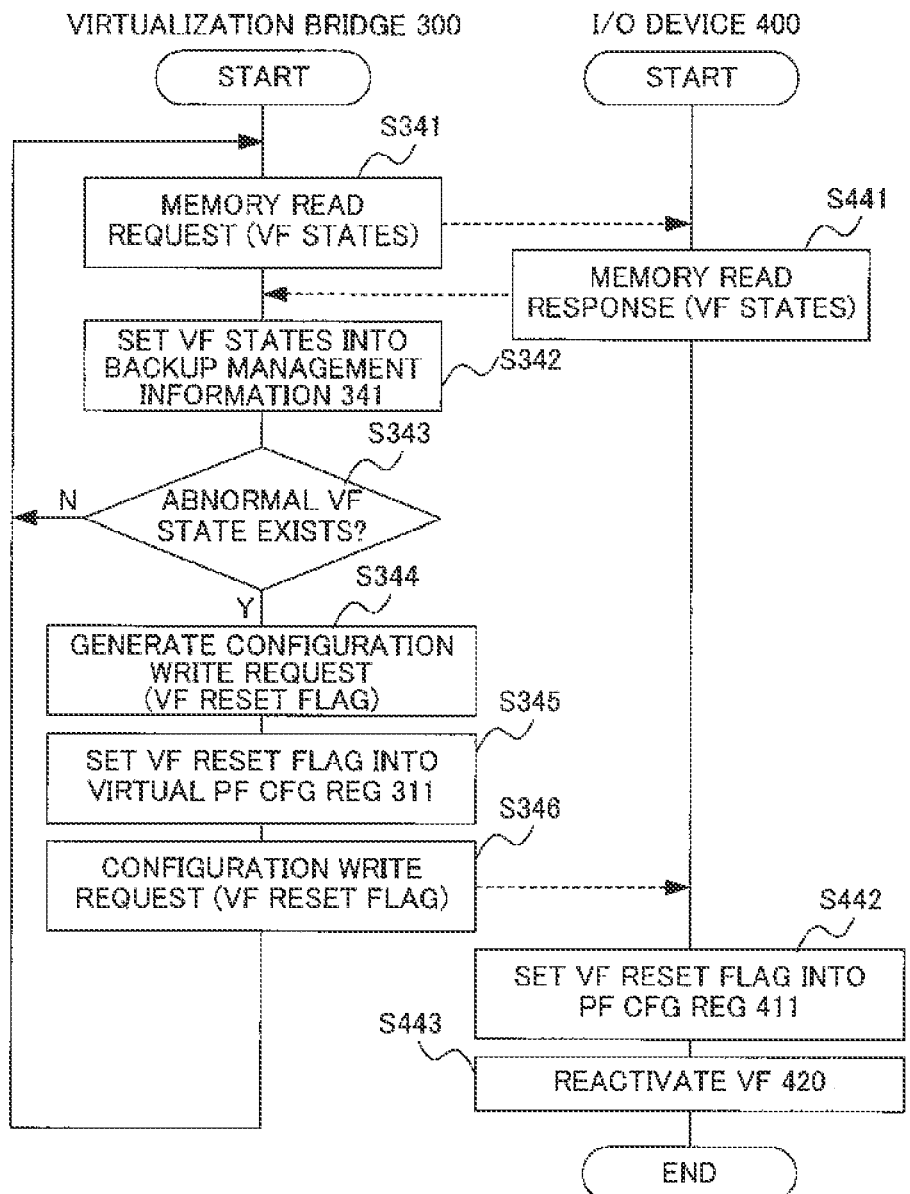
FIG. 15 is a flowchart illustrating control processing by a backup control unit 308 in the first exemplary embodiment of the present invention.

FIG. 15 is a flowchart illustrating the control processing by the backup control unit 308 in the first exemplary embodiment of the present invention.

First, the backup control unit 308 of the virtualization bridge 300 requests the I/O device 400 to read the VF states in the PF map area 351 using a memory read request (step S341). At this time, with reference to the backup management information 341, the backup control unit 308 requests reading of the VF states of the VFs 420 for the number of VFs.

For example, with reference to the backup management information 341 in FIG. 10, the backup control unit 308 requests reading of the VF states of the VFs 420-1 to 420-N.

The memory read request is transferred to the address translation unit 303 by the packet transfer unit 302. The address translation unit 303, without performing address translation, transmits the memory read request to the I/O device 400.

The I/O device 400 returns the VF states in the PF map area 351 to the virtualization bridge 300 using a memory read response (step S441). The address translation unit 303, without performing address translation, transmits the memory read response to the packet transfer unit 302. The memory read response is transferred to the backup control unit 308 by the packet transfer unit 302.

The backup control unit 308 sets the received VF states into the backup management information 341 (step S342).

For example, the backup control unit 308 sets the VF states of the VF 420-1 to 420-N into the backup management information 341 as illustrated in FIG. 10.

The backup control unit 308 judges whether or not a VF 420 having VF state "abnormal" exists (step S343).

When, in step S343, it is judged that no VF 420 having VF state "abnormal" exists (N in step S343), the processing from step S341 is performed regularly.

When, in step S343, it is judged that a VF(s) 420 having VF state(s) "abnormal" exist(s) (Y in step S343), the backup control unit 308 requests the virtualization unit 304 to write a VF reset flag(s) "Reset" using a configuration write request (step S344). In the configuration write request, the VF(s) 420 that has/have been detected to be abnormal is/are specified.

For example, the backup control unit 308 requests writing of a VF reset flag "Reset" for the VF 420-1.

The configuration write request is transferred to the virtualization unit 304 by the packet transfer unit 302.

The virtualization unit 304 sets the VF reset flag(s) for the specified VF(s) 420 in the virtual PF CFG REG 311 (step S345).

For example, the virtualization unit 304 sets the VF reset flag "Reset" for the VF 420-1 in the virtual PF CFG REG 311 as illustrated in FIG. 7.

The virtualization unit 304 requests the I/O device 400 to write the VF reset flag(s) for the specified VF(s) 420 using a configuration write request (step S346).

The I/O device 400 sets the VF reset flag(s) for the specified VF(s) 420 in the PF CFG REG 411 (step S442). With this processing, the I/O device 400 performs reactivation of the VF(s) 420 that has/have been detected to be abnormal (step S443).

For example, the I/O device 400 sets the VF reset flag "Reset" for the VF 420-1 in the PF CFG REG 411 as illustrated in FIG. 4. The I/O device 400 reactivates the VF 420-1.

When the reactivation of the VF(s) 420 has been completed, the virtualization unit 304 performs allocation of the VF map area(s) 352 with respect to the reactivated VF(s) 420 through processing similar to the processing in steps S316 to S319. With this processing, use of the reactivated VF(s) 420 by the operational computer(s) 200 becomes possible.

Subsequently, the processing from step S341 is performed repeatedly.

Thus, the operation of the first exemplary embodiment of the present invention is completed.

In the first exemplary embodiment of the present invention, when the backup control unit 308 performs memory access to the I/O device 400, the backup control unit 308 performs the memory access in the PF map area 351. However, without being limited to such an operation, the backup control unit 308 may perform the memory access in the virtual PF map area 151 with reference to the virtual PF CFG REG 311. In this case, the address translation unit 303 also performs address translation for memory access packets from the backup control unit 308 in the same manner as for memory access packets from the management computer 100.

Next, a characteristic configuration of the first exemplary embodiment of the present invention will be described. FIG.

1 is a block diagram illustrating the characteristic configuration of the first exemplary embodiment of the present invention.

Figure 1:
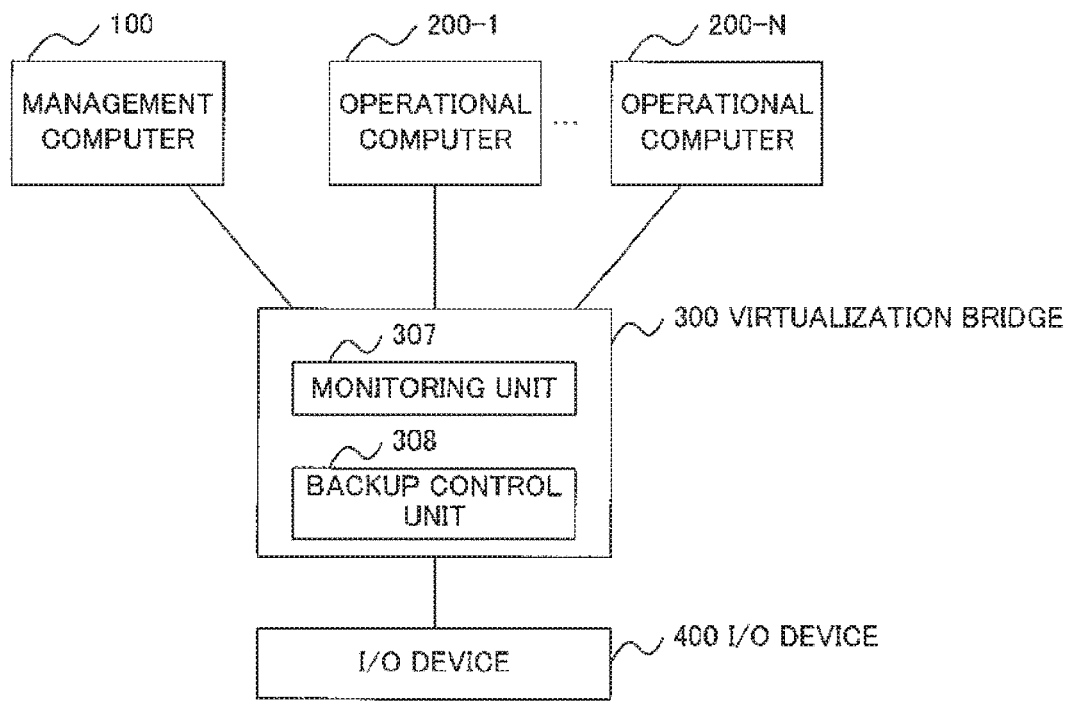
FIG. 1 is a block diagram illustrating a characteristic configuration of a first exemplary embodiment of the present invention.

Referring to FIG. 1, the virtualization bridge (information processing device) 300 includes the monitoring unit 307 and the backup control unit 308.

The virtualization bridge 300 provides the operational computers (computers) 200 with virtual functions of the I/O device 400.

The monitoring unit 307 detects failures in the management computer 100, which controls the I/O device 400 through the virtualization bridge 300.

The backup control unit 308 generates the backup management information 341 on the basis of packets transmitted and received between the management computer 100 and the I/O device 400. The backup management information 341 is information on the I/O device 400 that is required for controlling the I/O device 400 in place of the management computer 100. When a failure in the management computer 100 is detected by the monitoring unit 307, the backup control unit 308 controls the I/O device 400 on the basis of the backup management information 341 in place of the management computer 100.

Next, advantageous effects of the first exemplary embodiment of the present invention will be described.

With the first exemplary embodiment of the present invention, even when a failure occurs in a management computer in an I/O system in which an I/O device is shared between a plurality of operational computers, access to the I/O device by the operational computers can be continued. That is because, when a failure in the management computer 100 is detected by the monitoring unit 307, the backup control unit 308 controls the I/O device 400 on the basis of the backup management information 341 in place of the management computer 100. The backup management information 341 is generated on the basis of packets transmitted and received between the management computer 100 and the I/O device 400. With this configuration, it is possible to construct an I/O device sharing system with high reliability.

Further, a method in which a standby computer controls the I/O device in place of the management computer is conceivable as another method for dealing with failure in the management computer. In this case, a cost increases due to an operation and installation space of the standby computer. With the first exemplary embodiment of the present invention, it is possible to improve the reliability of the I/O system at low cost. That is because the backup control unit 308 included in the virtualization bridge 300 controls the I/O device 400 in place of the management computer 100.

Further, when a standby computer is used, since the standby computer is incapable of grasping a virtual PF map area in a management address space, it is impossible to generate the same information as management information from packets between the management computer and the virtualization bridge. Thus, another means for synchronizing the management information between the management computer and the standby computer is required. For the standby computer to perform memory access to the PF, a means for, in the virtualization bridge, managing a virtual PF map area in an address space in the standby computer is also required.

With the first exemplary embodiment of the present invention, it is possible to improve the reliability of an I/O system more easily than a case in which a standby management computer is used. That is because the backup control unit 308, with reference to the virtual PF CFG REG 311, generates the backup management information 341 and, using addresses in the PF map area 351, performs memory access to the PF 410. The backup management information 341 is generated by analyzing memory access in the virtual PF map area 151. With this configuration, the backup control unit 308 is capable of performing memory access to the PF 410 without using the above-described means.

Second Exemplary Embodiment

Next, a second exemplary embodiment of the present invention will be described.

The second exemplary embodiment of the present invention differs from the first exemplary embodiment of the present invention in that an I/O system includes a plurality of I/O devices 400 and a management computer 100 controls the plurality of I/O devices 400. First, a configuration of the second exemplary embodiment of the present invention will be described.

Figure 16:
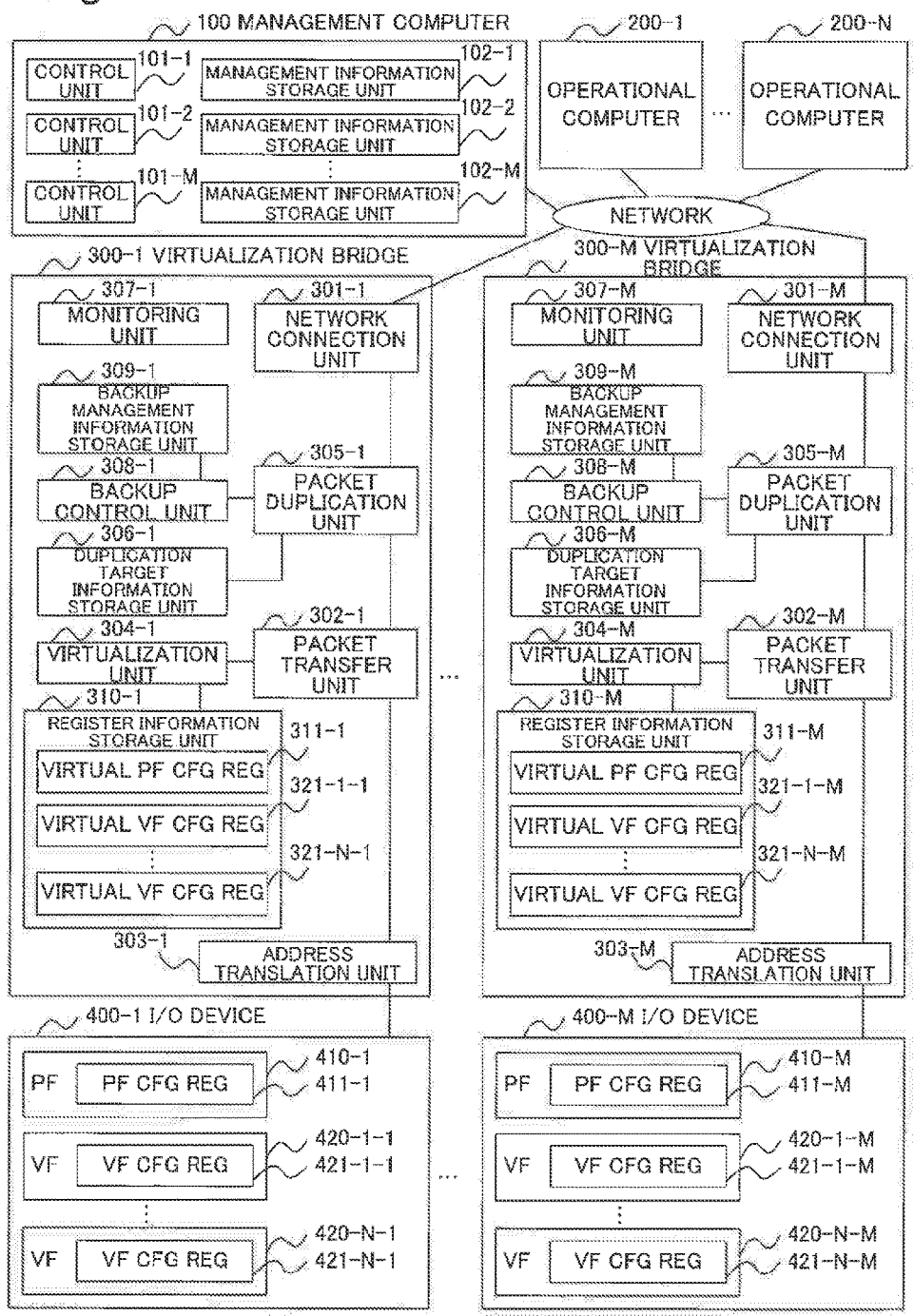
FIG. 16 is a block diagram illustrating a configuration of an I/O system in a second exemplary embodiment of the present invention.
Figure 17:
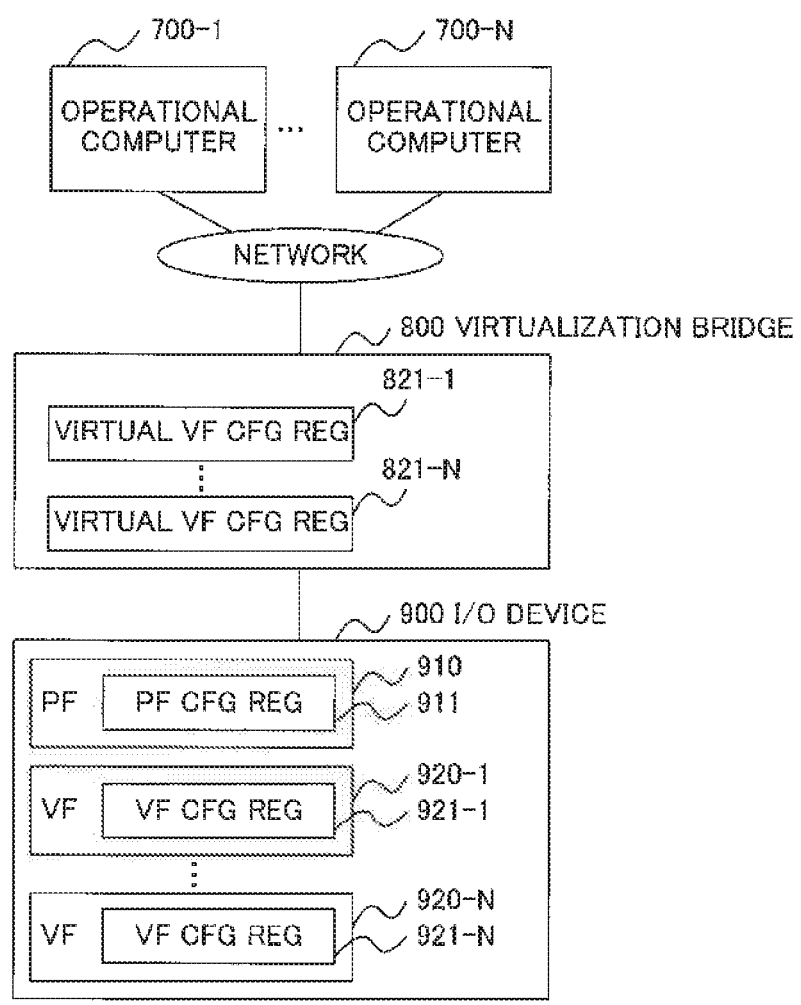
FIG. 17 is a block diagram illustrating a configuration of an I/O system in PTL1.
Figure 18:
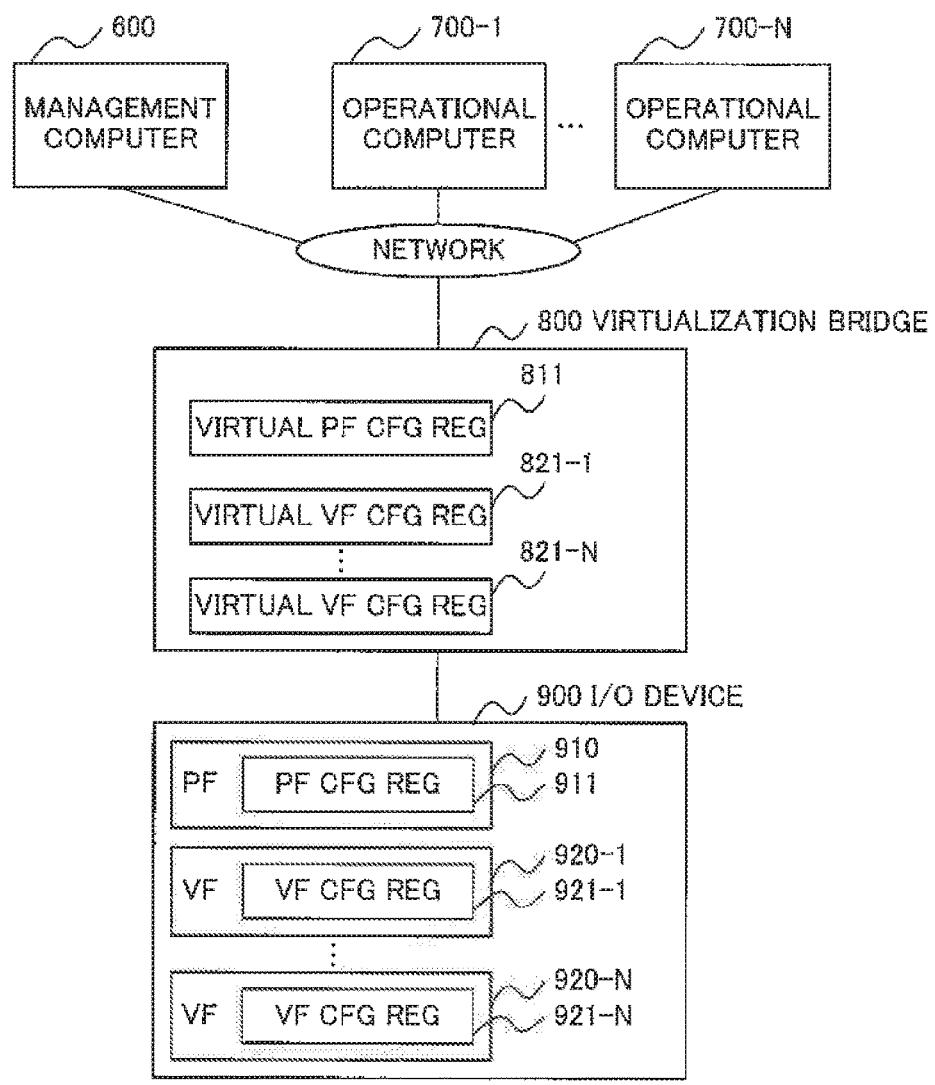
FIG. 18 is a block diagram illustrating a configuration of a system that is configured by adding a management computer 600 to the I/O system in PTL1.

FIG. 16 is a block diagram illustrating a configuration of the I/O system in the second exemplary embodiment of the present invention.

With reference to FIG. 16, the I/O system includes a management computer 100, operational computers 200 (200-1, 200-2, . . . , 200-N), I/O devices 400 (400-1, 400-2, . . . , 400-M) (M is an integer equal to or greater than 1), and virtualization bridges 300 (300-1, 300-2, . . . , 300-M). The virtualization bridges 300 (300-1, 300-2, . . . , 300-M) are connected to the I/O devices 400 (400-1, 400-2, . . . , 400-M), respectively.

The management computer 100 includes control units 101 (101-1, 101-2, . . . , 101-M) and management information storage units 102 (102-1, 102-2, . . . , 102-M). The control units 101-1, 101-2, . . . , 101-M control the I/O device 400-1, 400-2, . . . , 400-M through the virtualization bridges 300 (300-1, 300-2, . . . , 300-M), respectively.

Each of the operational computers 200-1, 200-2, . . . , 200-N is connected to any one of the I/O device 400-1, 400-2, . . . , 400-M through one of the virtualization bridges 300-1, 300-2, . . . , 300-M. Each operational computer 200 uses a VF 420 associated with the operational computer 200 in the connected I/O device 400.

The virtualization bridges 300-1, 300-2, . . . , 300-M include monitoring units 307-1, 307-2, . . . , 307-M and backup control units 308-1, 308-2, . . . , 308-M, respectively. Each monitoring unit 307 monitors a control unit 101 that controls the I/O device 400 to which the virtualization bridge 300 is connected. Each backup control unit 308, when a failure in the control unit 101 is detected, controls the I/O device 400 in place of the control unit 101.

An operation of the second exemplary embodiment of the present invention is the same as the operation of the first exemplary embodiment of the present invention except that the control units 101-1, 101-2, . . . , 101-M control the I/O devices 400-1, 400-2, . . . , 400-M, respectively.

When a failure has occurred in any one of the control units 101-1, 101-2, . . . , 101-M, the backup control unit 308 of the virtualization bridge 300 that is connected to the I/O device 400 controlled by the control unit 101 in which the failure has occurred controls the I/O device 400 in place of the control unit 101.

For example, in FIG. 16, when a failure has occurred in the control unit 101-1, which controls the I/O device 400-1, the backup control unit 308-1 of the virtualization bridge 300-1 controls the I/O device 400-1 in place of the control unit 101-1.

Thus, the operation of the second exemplary embodiment of the present invention is completed.

Next, an advantageous effect of the second exemplary embodiment of the present invention will be described.

With the second exemplary embodiment of the present invention, even in the case in which, while the management computer 100 is controlling a plurality of I/O devices, a failure has occurred in the control of one I/O device, it is possible to continue access to the respective I/O devices 400 by the operational computers. In this case, without influencing control of other I/O devices, access to the respective I/O devices 400 by the operational computers is continued.

That is because, when a failure is detected in a control unit 101 that controls an I/O device 400 corresponding to a virtualization bridge 300, the backup control unit 308 of the virtualization bridge 300 controls the I/O device 400 in place of the control unit 101. With this configuration, among the plurality of control units 101 of the management computer 100, only a control(s) by a control unit(s) 101 in which a failure(s) has/have been detected is/are switched to a control(s) by a backup control unit(s) 308.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-157346 filed on Jul. 23, 2013, the disclosure of which is incorporated herein in their entirety by reference.

REFERENCE SIGNS LIST

100 Management computer
101 Control unit
102 Management information storage unit
111 Management information
150 Management address space
151 Virtual PF map area
200 Operational computer
250 Operational address space
251 Virtual VF map area
300 Virtualization bridge
301 Network connection unit
302 Packet transfer unit
303 Address translation unit
304 Virtualization unit
305 Packet duplication unit
306 Duplication target information storage unit
307 Monitoring unit
308 Backup control unit
309 Backup management information storage unit
310 Register information storage unit
311 Virtual PF CFG REG
321 Virtual VF CFG REG
331 Duplication target information
341 Backup management information
350 I/O address space
351 PF map area
352 VF map area
400 I/O device
410 PF
411 PF CFG REG
420 VF
421 VF CFG REG
600 Management computer
700 Operational computer
800 Virtualization bridge
811 Virtual PF CFG REG
821 Virtual VF CFG REG
900 I/O device
910 PF
911 PF CFG REG
920 VF
921 VF CFG REG

The invention claimed is:

1. An information processing device for providing a virtual function of an I/O device to a computer comprising:
a monitoring unit which detects a failure in a management computer which controls the I/O device through the information processing device; and
a backup control unit which generates backup management information on the basis of packets transmitted and received between the management computer and the I/O device, the backup management information being information on the I/O device and required to control the I/O device in place of the management computer, and controls the I/O device in place of the management computer on the basis of the backup management information when a failure in the management computer is detected by the monitoring unit.

2. The information processing device according to claim 1,
wherein the management computer controls the I/O device on the basis of management information, which is information on the I/O device, and
the backup control unit, on the basis of packets transmitted and received between the management computer and the I/O device, updates the backup management information so that the backup management information coincides with the management information.

3. The information processing device according to claim 2,
wherein the backup control unit updates the backup management information on the basis of packets that meet a predetermined condition among packets transmitted and received between the management computer and the I/O device.

4. The information processing device according to claim 1,
wherein the management computer, in a control of the I/O device, performs at least either configuration access, which is access to a register in a control function of the I/O device, or memory access, which is access to addresses to which the control function is allocated, and
the backup control unit, in the case of controlling the I/O device in place of the management computer, performs the configuration access and the memory access, which the management computer performs in a control of the I/O device, in place of the management computer.

5. The information processing device according to claim 4, further comprising:
a storage unit which stores addresses to which the control function is allocated in an address space in the information processing device and addresses to which the control function is allocated in an address space in the management computer; and
an address translation unit which, when the management computer performs the memory access by using the address space in the management computer, translates addresses of transmitted and received packets between the address space in the management computer and the address space in the information processing device with reference to the storage unit,
wherein the backup control unit, in performing the memory access by using the address space in the management computer, generates the backup management information by analyzing transmitted and received packets with reference to the storage unit.

6. The information processing device according to claim 1,
wherein the I/O device is an I/O device conforming to the SR-IOV (Single Root I/O Virtualization) standard.

7. An I/O system, comprising:
an I/O device;
an information processing device that provides a virtual function of the I/O device to a computer; and
a management computer that controls the I/O device through the information processing device,
wherein the information processing device includes:
    a monitoring unit which detects a failure in the management computer; and
    a backup control unit which generates backup management information on the basis of packets transmitted and received between the management computer and the I/O device, the backup management information being information on the I/O device and required to control the I/O device in place of the management computer, and controls the I/O device in place of the management computer on the basis of the backup management information when a failure in the management computer is detected by the monitoring unit.

8. The I/O system according to claim 7, comprising:
a plurality of the I/O devices; and
a plurality of the information processing device each of which is associated with one of the plurality of the I/O devices,
wherein the management computer comprises a plurality of control units each of which is associated with one of the plurality of the I/O devices, and each of the plurality of control units controls the I/O device associated with the control unit through the information processing device associated with the I/O device, and
the backup control unit in each of the plurality of the information processing devices, when a failure in the control unit that controls the I/O device associated with the information processing device is detected, controls the I/O device in place of the control unit.

9. An I/O control method of information processing device for providing a virtual function of an I/O device to a computer comprising:
detecting a failure in a management computer which controls the I/O device through the information processing device;
generating backup management information on the basis of packets transmitted and received between the management computer and the I/O device, the backup management information being information on the I/O device and required to control the I/O device in place of the management computer; and
controlling the I/O device in place of the management computer on the basis of the backup management information when a failure in the management computer is detected.

10. A non-transitory computer readable storage medium recording thereon a program executed on information processing device for providing a virtual function of an I/O device to a computer, the program causing a computer to execute processes comprising:
detecting a failure in a management computer which controls the I/O device through the information processing device;
generating backup management information on the basis of packets transmitted and received between the management computer and the I/O device, the backup management information being information on the I/O device and required to control the I/O device in place of the management computer; and
controlling the I/O device in place of the management computer on the basis of the backup management information when a failure in the management computer is detected.

11. An information processing device for providing a virtual function of an I/O device to a computer comprising:
a monitoring means for detecting a failure in a management computer which controls the I/O device through the information processing device; and
a backup control means for generating backup management information on the basis of packets transmitted and received between the management computer and the I/O device, the backup management information being information on the I/O device and required to control the I/O device in place of the management computer, and controlling the I/O device in place of the management computer on the basis of the backup management information when a failure in the management computer is detected by the monitoring means.

12. An I/O system, comprising:
an I/O device;
an information processing device that provides a virtual function of the I/O device to a computer; and
a management computer that controls the I/O device through the information processing device,
wherein the information processing device includes:
    a monitoring means for detecting a failure in the management computer; and
        a backup control means for generating backup management information on the basis of packets transmitted and received between the management computer and the I/O device, the backup management information being information on the I/O device and required to control the I/O device in place of the management computer, and controlling the I/O device in place of the management computer on the basis of the backup management information when a failure in the management computer is detected by the monitoring means.

* * * * *